(12) United States Patent
Wang et al.

(10) Patent No.: US 12,450,244 B2
(45) Date of Patent: Oct. 21, 2025

(54) AUTOMATIC ONLINE LOG TEMPLATE MINING

(71) Applicant: INTERNATIONAL BUSINESS MACHINES CORPORATION, Armonk, NY (US)

(72) Inventors: Chen Wang, Chappaqua, NY (US); Lingfei Wu, Elmsford, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 129 days.

(21) Appl. No.: 16/867,118

(22) Filed: May 5, 2020

(65) Prior Publication Data
US 2021/0349895 A1  Nov. 11, 2021

(51) Int. Cl.
*G06F 16/24* (2019.01)
*G06F 16/2455* (2019.01)
*G06F 16/2458* (2019.01)

(52) U.S. Cl.
CPC .... *G06F 16/2465* (2019.01); *G06F 16/24558* (2019.01)

(58) Field of Classification Search
CPC .......... G06F 16/2465; G06F 16/24558; G06F 40/194; G06F 40/284; G06F 40/186
See application file for complete search history.

(56) References Cited

U.S. PATENT DOCUMENTS

| | | | | |
|---|---|---|---|---|
| 5,077,805 A | * | 12/1991 | Tan | G06V 30/2504 382/209 |
| 6,658,626 B1 | * | 12/2003 | Aiken | G06F 40/289 715/205 |
| 7,389,306 B2 | * | 6/2008 | Schuetze | G06F 16/88 707/811 |
| 7,673,174 B2 | * | 3/2010 | Swift | G06F 11/1482 719/321 |
| 8,291,319 B2 | | 10/2012 | Li et al. | |
| 8,495,429 B2 | * | 7/2013 | Fu | G06F 11/3608 714/25 |

(Continued)

FOREIGN PATENT DOCUMENTS

| | | | | |
|---|---|---|---|---|
| CN | 110175158 A | * | 8/2019 | |
| CN | 111160021 A | * | 5/2020 | |

(Continued)

OTHER PUBLICATIONS

Julia Allen et al., Securing Network Servers, Apr. 2000, Carnegie Mellon University, p. 4 and p. 27 (Year: 2000).*

(Continued)

*Primary Examiner* — Pierre Vital
*Assistant Examiner* — Andrew N Ho
(74) *Attorney, Agent, or Firm* — Tutunjian & Bitetto, P.C.; Stosch Sabo

(57) ABSTRACT

Methods and systems for log message aggregation include determining a first similarity distance score for a first incoming message by comparing the first incoming message to one or more stored templates. It is determined that the first incoming message imperfectly matches a matched template of the one or more stored templates, based on the first similarity distance score. A token in the imperfectly matched template is replaced with a wildcard, to reduce the first similarity distance score.

16 Claims, 8 Drawing Sheets

(56) References Cited

U.S. PATENT DOCUMENTS

| | | | |
|---|---|---|---|
| 10,033,766 B2* | 7/2018 | Gupta | H04L 63/20 |
| 10,200,397 B2* | 2/2019 | Dhar | H04L 63/1433 |
| 10,353,756 B2* | 7/2019 | Yoon | G06F 9/546 |
| 10,430,323 B2 | 10/2019 | Raman et al. | |
| 2002/0099536 A1* | 7/2002 | Bordner | G06F 40/284 |
| | | | 704/10 |
| 2008/0126335 A1* | 5/2008 | Gandhi | G06F 16/319 |
| | | | 707/999.005 |
| 2009/0282033 A1* | 11/2009 | Alshawi | G06F 16/9032 |
| | | | 707/999.005 |
| 2012/0124047 A1* | 5/2012 | Hubbard | G06F 16/332 |
| | | | 707/769 |
| 2014/0149107 A1* | 5/2014 | Schilder | G06F 40/56 |
| | | | 704/9 |
| 2015/0261745 A1* | 9/2015 | Song | G06F 40/56 |
| | | | 704/9 |
| 2015/0379887 A1* | 12/2015 | Becker | G06F 16/93 |
| | | | 715/229 |
| 2016/0239755 A1* | 8/2016 | Aggour | G06F 16/24568 |
| 2016/0350400 A1* | 12/2016 | Zhu | H04L 67/02 |
| 2017/0132291 A1* | 5/2017 | Liu | G06F 11/3006 |
| 2017/0220545 A1* | 8/2017 | Gururajan | G06F 40/106 |
| 2018/0060748 A1* | 3/2018 | Xu | G06F 17/16 |
| 2019/0163674 A1* | 5/2019 | Chen | G06F 16/3335 |

FOREIGN PATENT DOCUMENTS

| | | | | |
|---|---|---|---|---|
| CN | 111240942 A | * | 6/2020 | G06F 11/3072 |
| JP | 2011186516 A | * | 9/2011 | |

OTHER PUBLICATIONS

T. Kimura, A. Watanabe, T. Toyono and K. Ishibashi, "Proactive failure detection learning generation patterns of large-scale network logs," 2015 11th International Conference on Network and Service Management (CNSM), Barcelona, Nov. 2015, pp. 8-14.

L. Tang and T. Li, "LogTree: A Framework for Generating System Events from Raw Textual Logs," 2010 IEEE International Conference on Data Mining, Sydney, NSW, Dec. 2010, pp. 491-500.

M. Du and F. Li, "Spell: Streaming Parsing of System Event Logs," 2016 IEEE 16th International Conference on Data Mining (ICDM), Barcelona, Dec. 2016, pp. 859-864.

Authors et al.: IBM, "Method and System for Mining Typed Social Network Information", IP.com No. IPCOM000191371D, Dec. 2009, pp. 1-3.

Authors et al.: Disclosed Anonymously, "Intelligent log framework for distributed environment applications", IP.com No. IPCOM000220081D, Jul. 2012, pp. 1-7.

Authors et al.: Disclosed Anonymously, "Method and cognitive system for creating and updating "User Email Writing Profile"", IP.com No. IPCOM000247047D, Jul. 2016, pp. 1-27.

Hamooni et al., "Logmine: Fast pattern recognition for log analytics", DOI: 10.1145/2983323.2983358, Oct. 2016, 11 pages.

Mizutani Masayoshi, "Incremental Mining of System Log Format", 2013 IEEE International Conference on Services Computing, Jun. 28, 2013-Jul. 3, 2013, pp. 595-602.

Shima Keiichi, "Length matters: Clustering system log messages using length of words", arXiv: 1611.03213v1, Nov. 10, 2016, 10 pages.

* cited by examiner

AUTOMATIC ONLINE LOG TEMPLATE MINING

BACKGROUND

The present invention generally relates to mining information from logs that are aggregated from multiple sources, and, more particularly, to the use of online density-based clustering to identify templates within the log messages.

As enterprise systems continue to grow in size, the number of different components that generate log information grow alongside them. Each component can generate log messages continuously, resulting in many millions of log messages being generated on a daily basis. It is not possible for a human being to manually review all of the log messages, so log analysis software is used to help identify the signs of anomalous behavior that may be buried in the logs. Other applications for such log analysis include the prediction of system failure, root cause analysis and diagnosis, identification of performance and security issues, and debugging.

Existing log analysis solutions attempt to aggregate similar messages, but all existing solutions suffer from one or more deficiencies. For example, some systems identify token words and their positions, or the number of words in a message, to identify message templates. Such systems have difficulty handling changes in the token position and message length. Other systems suffer from poor scalability and are unable to keep up with the high volumes of log message data that enterprise networks can generate. These systems, and others, all fail to provide a solution to online log message aggregation that can effectively be deployed in enterprise systems.

SUMMARY

A method for log message aggregation includes determining a first similarity distance score for a first incoming message by comparing the first incoming message to one or more stored templates. It is determined that the first incoming message imperfectly matches a matched template of the one or more stored templates, based on the first similarity distance score. A token in the imperfectly matched template is replaced with a wildcard, to reduce the first similarity distance score. The method provides scalable log aggregation that can efficiently update message templates during operation.

In an advantageous embodiment of the method, the similarity distances score can be determined as a token-based edit distance between the first incoming message and a template. The token-based edit distance makes comparisons between messages and templates simple and efficient.

In an advantageous embodiment of the method, a second similarity distance score is determined for a second incoming message by comparing the second incoming message to the one or more stored templates. It is determined that the second similarity distance score does not match any of the one or more stored templates. A new template that is based on the second incoming message is stored. The non-matching messages can thus be used to generate new templates for future matching.

In an advantageous embodiment of the method, determining the first similarity distance score and the second similarity distance score are processed in parallel. This makes it possible to handle multiple log messages at once.

A log aggregation system includes a hardware processor and a memory that is configured to store one or more templates and program code. When executed by the hardware processor, the program code is configured to implement a template matcher and a template updater. The template matcher is configured to determine a first similarity distance score for a first incoming message by comparing the first incoming message to the one or more stored templates, and to determine that the first incoming message imperfectly matches a matched template of the one or more stored templates, based on the first similarity distance score. The template updater is configured to replace a token in the imperfectly matched template with a wildcard, to reduce the first similarity distance score.

In an advantageous embodiment of the log aggregation system, the similarity distances score can be determined as a token-based edit distance between the first incoming message and a template. The token-based edit distance makes comparisons between messages and templates simple and efficient.

In an advantageous embodiment of the log aggregation system, a second similarity distance score is determined for a second incoming message by comparing the second incoming message to the one or more stored templates. It is determined that the second similarity distance score does not match any of the one or more stored templates. A new template that is based on the second incoming message is stored. The non-matching messages can thus be used to generate new templates for future matching.

In an advantageous embodiment of the log aggregation system, determining the first similarity distance score and the second similarity distance score are processed in parallel. This makes it possible to handle multiple log messages at once.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Embodiments of the present invention use a token-based edit distance and density-based online clustering to provide online template mining and log message aggregation. As log messages arrive, the present embodiments first determine whether a new message matches an existing template. If so, it is used to update the stored templates. If not, density-based clustering is used to group the new message with existing templates or, alternatively, to create a new template that is based on the message.

The present embodiments thereby efficiently process log messages in a manner that is scalable to very large volumes. Additional advantages over existing log aggregation solutions include, for example, handling messages with shifting tokens, adaptively adjusting dissimilarity costs in accordance with variable tokens, mining templates in an online fashion for streaming log messages, and automatically extracting templates based on minimum editing operations.

It is to be understood that although this disclosure includes a detailed description on cloud computing, implementations of the teachings recited herein are not limited to a cloud computing environment. Rather, embodiments of the present invention are capable of being implemented in conjunction with any other type of computing environment now known or later developed.

Figure 1A:
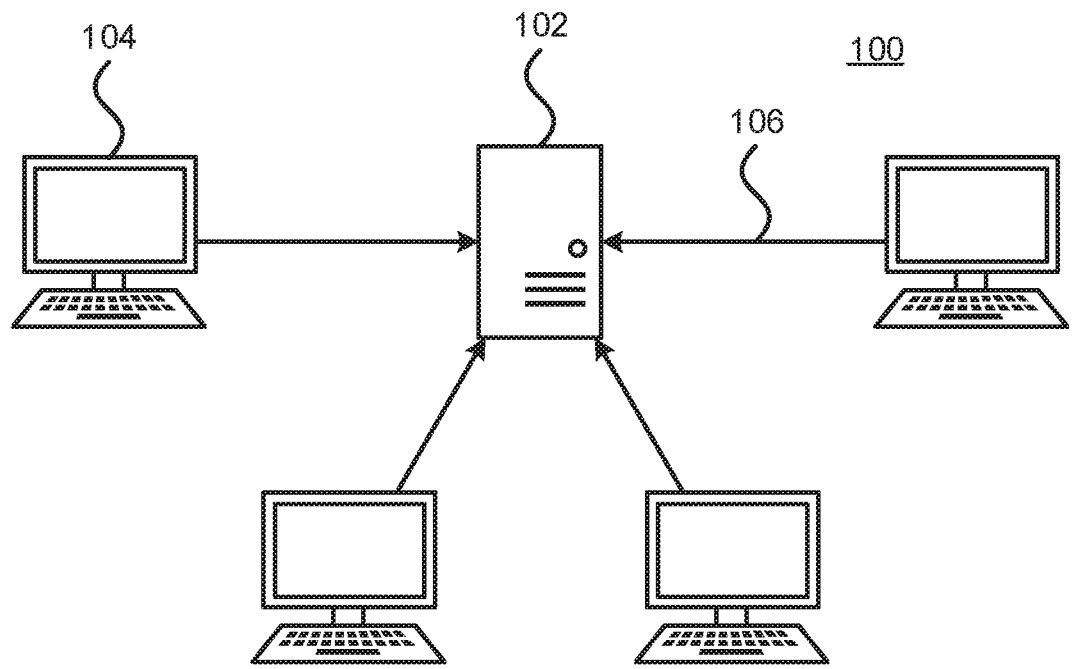
FIG. 1A is a diagram of a networked system that includes multiple reporting systems that report log messages to a log aggregation system, in accordance with an embodiment of the present invention.

Referring now to the drawings in which like numerals represent the same or similar elements and initially to FIG. 1A, an exemplary network 100 is shown. A variety of reporting systems 104 provide streaming log messages 106 to a log analysis system 102. It should be understood that, although the present embodiments are described in the context of a network of discrete computer systems, it should be understood that the systems 104 can represent individual hardware sub-components within a single computer system, and can also represent software components. In addition, each system 104 may include a variety of sub-systems that all provide log messages 106. Furthermore, although the network 100 is shown as being relatively limited in size, it should be understood that the present embodiments can be scaled to include messages arriving from many thousands of individual systems 104, spread over a wide geographical area.

Each of the systems 104 may send one or more different kinds of log messages 106, with potentially each of these kinds of log messages having a different message format. In some embodiments, at least some of the systems 104 will generate messages 106 that share a general message format, but which use different variables, or which differ from the other messages in some minor way. Messages which are similar to one another in their message format can be grouped together using a message "template," which identifies portions of the message that are shared between similar messages, and portions of the message that may differ.

The log analysis system 102 can extract information from the collected logs, for example, identifying anomalous behavior from messages that do not match existing templates. The log analysis system 102 can, therefore, act as a tool for network maintenance and security management, for example, by automatically taking corrective actions on one or more systems 104 when anomalous behavior is detected. The log analysis system 102 can also provide log analysis results to a human operator for review, for example, by flagging messages that are anomalous or that represent evidence of potential security breaches.

Figure 1B:
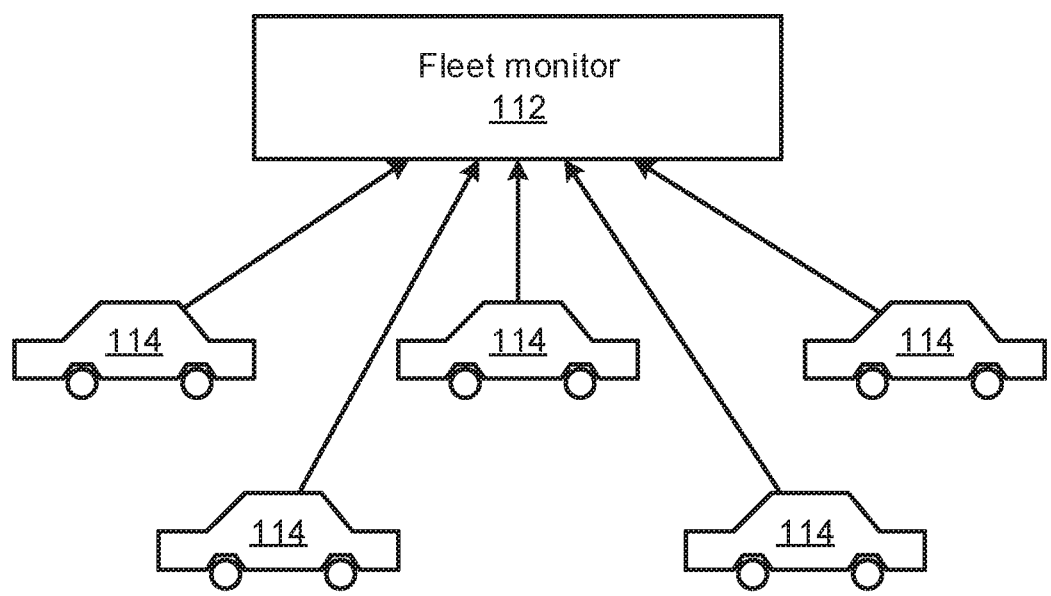
FIG. 1B is a diagram of a monitoring system for a fleet of vehicles that report status messages to a fleet monitor, in accordance with an embodiment of the present invention.

Referring now to FIG. 1B, a fleet of vehicles 114 is shown, communicating vehicle status information to a fleet monitor 112. The vehicles 114 each monitor a variety of systems, for example using an on-board diagnostic system and car-area network, and generate messages that reflect the status of those systems. Each vehicle 114 may monitor a different set of variables, and may come from a different manufacturer, and thus may generate status messages relating to a variety of different vehicle systems, in a variety of different formats. The vehicle monitor 112 automatically identifies similar messages and aggregates them together, building appropriate message templates in the process.

Figure 2:
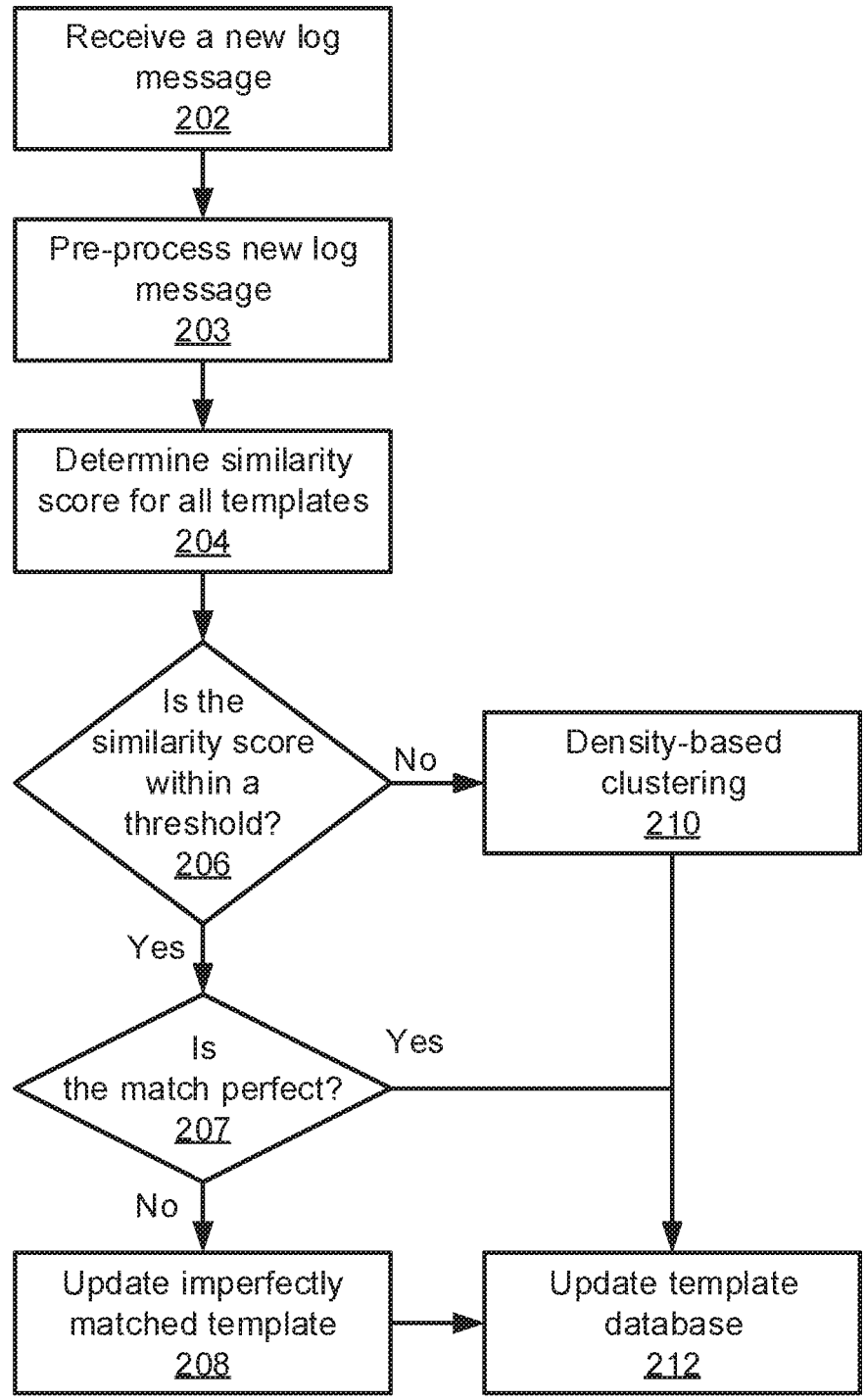
FIG. 2 is a block/flow diagram of a method for performing log message aggregation, in accordance with an embodiment of the present invention.

Referring now to FIG. 2, a method for processing a new log message 106 is shown. Block 202 receives the new log message 106 from a system 104. Block 203 pre-processes the new log message. This pre-processing step can include, for example, tokenizing the message and replacing all numbers with a wildcard, such as "<*>". Thus, for example, if a message is received that reads, "session opened for user test by (uid=0)", then the pre-processed message can be represented as "session opened for user test by (uid=<*>)". Tokenization can be performed using any appropriate delimiters, including white space and punctuation as shown.

Block 204 then compares the new log message 106 to all of the log message templates that have been stored in a template database. This comparison may use, for example, a token-based edit distance. In some embodiments, the token-based edit distance can be determined using a Levenshtein algorithm, which provides a metric for the number of changes needed to change one string of tokens into another. Such embodiments provide rapid log matching by providing a simple metric for message similarity.

Thus, comparing the above message to a template that reads, "session opened for user cyrus by (uid=<*>)", the edit distance would be 1, due to the difference between the tokens "test" and "cyrus." The more differences there are between the tokens of the new message and the tokens of a given template, the greater the edit distance will be. The edit distance can be normalized, by dividing by the number of tokens in the shorter of two sequences, thereby ensuring that the normalized edit distance will be a number between 0 and 1. This value can be used as a normalized similarity score. The use of the token-based edit distance addresses the challenge of handling messages with shifting token positions, without losing the information that is encoded in the sequence of tokens.

In addition, the use of wildcards in a template can reduce the edit distance. Following the above example, if the message were instead compared to the template, "session opened for user <*> by (uid=<*>)", where the term "cyrus" is replaced by a wildcard, then the edit distance would be zero. The present embodiments seek to generalize templates when possible, thereby automatically accounting for messages that use, for example, new usernames or process identifiers. The present embodiments therefore efficiently handle short messages that include relatively many variables.

Block 206 compares the similarity score to a threshold. For example, if the normalized similarity score for a given template is below a matching threshold, then block 206 determines that the message has matched the template. Block 207 then determines whether the match is perfect. For example, a similarity distance score of zero may represent a perfect match, while a non-zero, but below-threshold score may represent an imperfect match. If a perfect match is found, block 212 updates the template database to indicate that the log message is associated with the matched template, for example by assigning the template identifier to the matched log message.

If an imperfect match is found to a template in the template database, block 208 performs a template update on the template having the closest match. If a given message has a below-threshold similarity score to multiple templates, then the template having a lowest score can be selected. If multiple templates have an equally low similarity score, then one of the equally matched templates can be selected randomly, or can be selected by any other appropriate means.

Block 208 identifies changes that can be made to the template to make the new message a perfect match (having a similarity score of zero). In some embodiments, this threshold can be set to the exemplary value of 0.25. Block 208 locates tokens that can be deleted, substituted, or added, for example, using a Levenshtein matrix, to make the template cover the new message. Following the above example, a first template, "session opened for user cyrus by (uid=<*>)", may be changed to, "session opened for user <*> by (uid=<*>)". The new message now perfectly matches the updated template, and block 212 stores the updated template in the templates database. Block 212 further assigns the updated template identifier to the matched log message.

If the new message is not a below-threshold match to any template in the template database, then block 210 performs density-based online clustering, as described in greater detail below. The result of block 210 is to identify new templates, based on the new matches, and block 212 updates the template database using these new templates. As additional messages arrive that match the new templates, these new templates can be generalized through the template extraction of block 208.

Following this process, consider the following set of log messages, arriving in order:
1. connection from 202.82.200.188 ( ) at Fri July 1 07:57:30 2005
2. session opened for user test by (uid=509)
3. session closed for user test
4. connection from 211.72.151.162 ( ) at Wed July 6 18:00:56 2005
5. session opened for user admin by (uid=509)
6. session closed for user admin
7. session opened for user news by (uid=509)
8. session closed for user news
9. restart When the first message arrives, there are no templates yet, so it does not match any template. Block 210 thus creates a new template, including numerical wildcards, as "connection from <*> ( ) at <*>", and block 212 stores this as the first template in the template database. In some embodiments, the date information may be represented as a number that is converted to the wildcard format in a template.

When the second message arrives and is determined to be quite different from the first stored template, block 210 creates another new template, "session opened for user test by (uid=<*>)", and block 212 stores this template in the template database.

When the third message arrives and is found to have above-threshold distance from the templates that have already been stored, block 210 creates the template, "session closed for user test". At this point, there are no wildcards in this new template.

When the fourth message arrives, blocks 204 and 206 find that the message is a match to the first template. Because it is an exact match, after taking the wildcards into account, there is no need to update the stored templates.

When the fifth message arrives, blocks 204 and 206 find a non-zero distance between the message and the second template, but determine it to be below the threshold. Thus, the message is deemed to match the stored threshold. Block 208 updates the second stored template to reflect the difference between the token "test" and the token "admin," representing this part of the template as a new wildcard: "session opened for user <*> by (uid=<*>)".

When the sixth message arrives, blocks 204 and 206 find a non-zero distance between the message and the third template, but determine it to be below the threshold. Thus, the message is deemed to match the stored threshold. Block 208 updates the second stored template to reflect the difference between the token "test" and the token "admin," representing this part of the template as a new wildcard: "session closed for user <*>".

When the seventh and eighth messages arrive, their use of the distinct token "news" does not stop them from matching the second and third templates, respectively, due to the presence of wildcards in those templates.

When the ninth message arrives, there is no matching template, so a new template of "restart" is created and stored. Notably, although the ninth message includes only a single token, the normalized distance between it and the templates will be a 1—the largest possible value. The normalization causes a smaller number of edits within a short message to be regarded as less similar than the same number of edits within a longer message.

It should be noted that the present embodiments can include parallel processing of the incoming messages. In particular, blocks 202, 203, 204, and 206 can be performed in parallel, with unmatched messages being diverted to a single, shared queue for handling in blocks 208 and 210. The update of the templates can be regarded as being atomic, and will happen only rarely after the templates have been updated to an appropriate level of generality.

Figure 3:
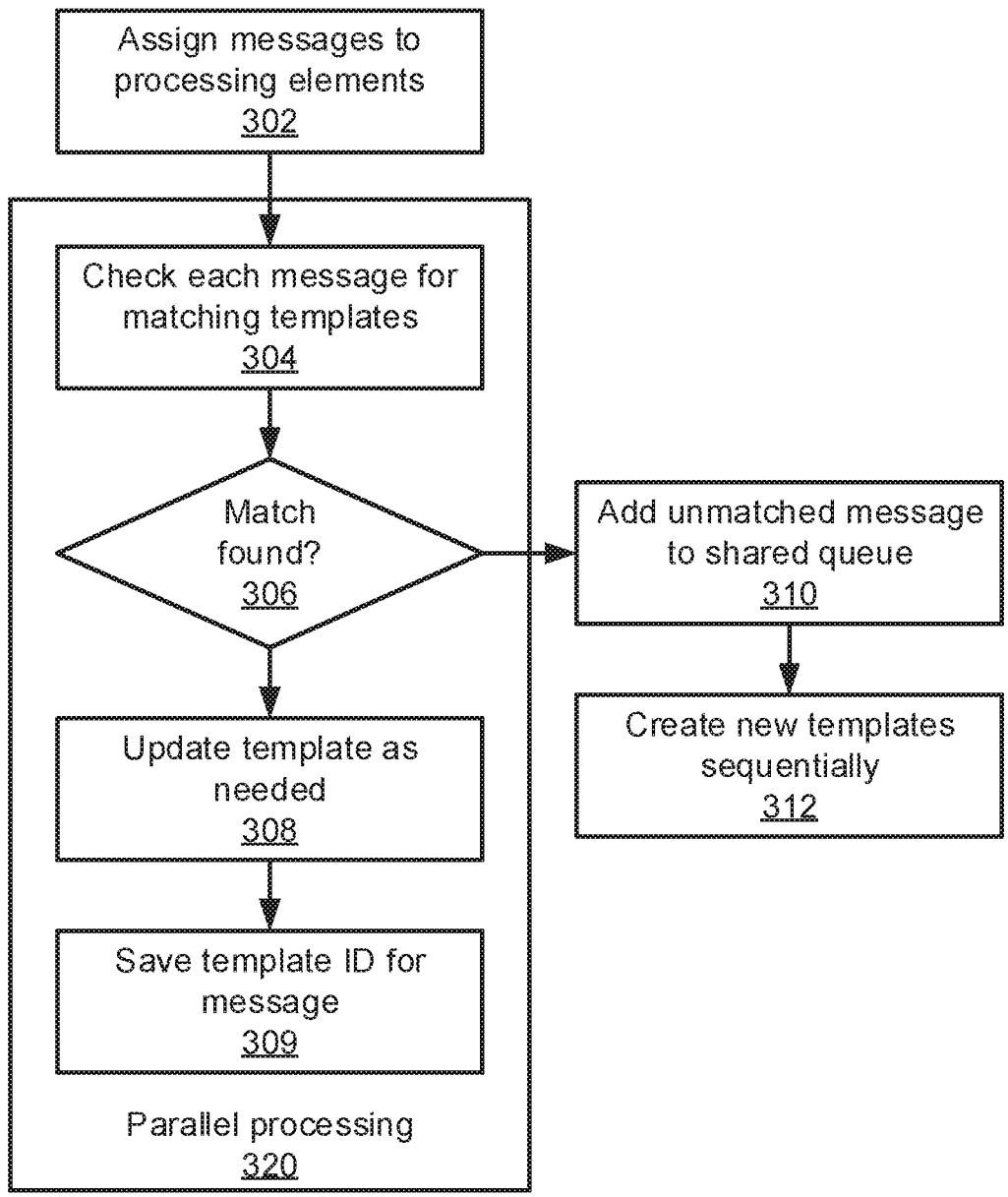
FIG. 3 is a block/flow diagram of a method for performing log message aggregation, including parallel template matching and updating, in accordance with an embodiment of the present invention.

Referring now to FIG. 3, a method for parallel processing of log message aggregation is shown. Block 302 assigns the incoming log messages 106 to respective processing elements. As will be described in greater detail below, the processing elements may include, for example, respective processing cores within a single hardware processor, multiple software instances within a single computer system, or multiple distinct computer systems within a cloud computing environment. It should be understood that the term "processing element" is not intended to be limiting, but may include any appropriate execution platform.

There may be as many processing elements as needed, with each processing element handling one or more log messages 106 at a time. Block 320 represents a parallel processing phase, whereby multiple processing elements operate simultaneously, to improve log aggregation throughput. Each processing element then checks each incoming message 106 for matching templates in the template database. Block 306 determines whether the incoming log message matches one or more of the stored templates.

If so, block 308 updates the matched template, if needed. For example, if the log message is similar enough to have a similarity score that falls below a similarity distance threshold to the matched template, but is not a perfect match (e.g., it has a non-zero similarity score), the template may be generalized as described above. Block 309 then registers the log message as matching the template, for example assigning a template identifier to the log message for subsequent analysis.

If there is no matching template, then block 310 assigns the unmatched log message to a single queue, shared by all of the processing elements. This queue may have a number of slots that equals or exceeds the number of different parallel processes. Thus, even in the event that every log message that is being processed in parallel is unmatched by any template, the queue can accommodate all of them. Block 312 creates new templates for the log messages in the shared queue sequentially, and assigns the new template identifier to those log messages. Every time a new template is generated in block 312, the remaining unmatched messages in the shared queue are checked against the new template, with matching messages being removed from the shared queue. This prevents multiple redundant new templates being generated by repeated messages in the queue.

The result of the parallel processing is a set of aggregated log messages, each identified by a corresponding template. As the processing continues, template updating creates a set of generalized templates that adequately handle nearly all incoming messages in an efficient manner.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

These and other variations of a hardware processor subsystem are also contemplated in accordance with embodiments of the present invention.

Figure 4:
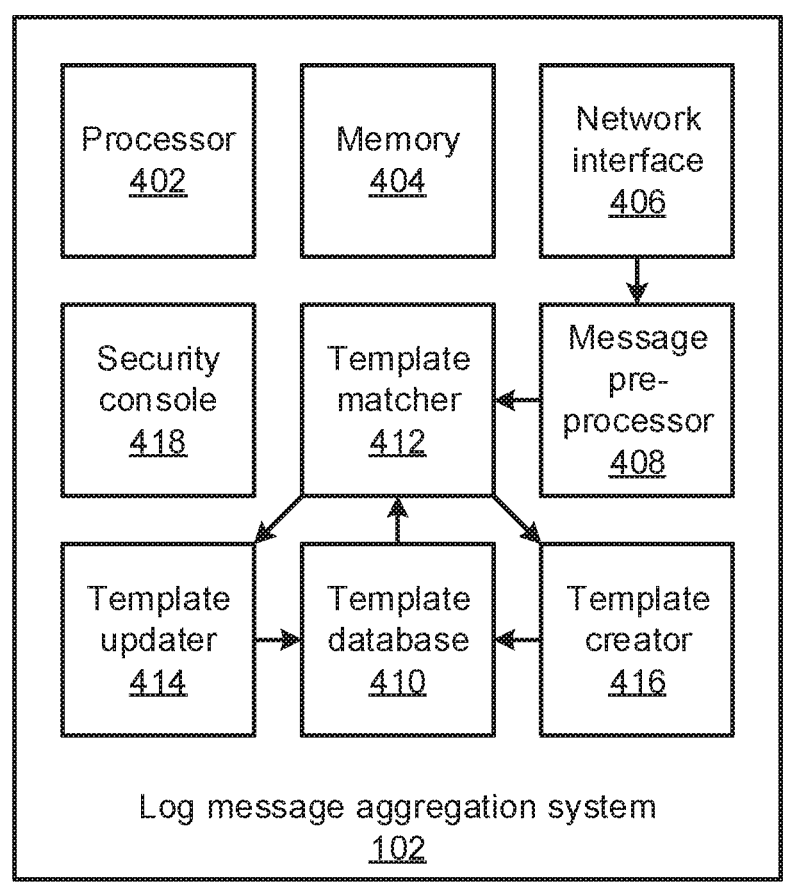
FIG. 4 is a block diagram of a log aggregation system, in accordance with an embodiment of the present invention.

Referring now to FIG. 4, a log message aggregation system 102 is shown. This embodiment is described in the context of a single-processor system, but it should be understood that multiple processing elements can be used instead, as described below. The system 102 includes a hardware processor 402 and a memory 404. A network interface 406 communicates with various other systems 104, collecting log messages 106 from those systems. The network interface 406 may communicate by any appropriate wired or wireless network communications medium and protocol.

Each incoming message 106 is pre-processed by message pre-processor 408. The message pre-processor 408 may, for example, replace numbers in the log message with a wildcard string, since numbers in log messages are often very variable and may provide little assistance in performing meaningful aggregation. A template matcher 412 compares the pre-processed log message to a set of templates, stored in a template database 410. The template database 410 may, for example, be stored in local memory 404, or may be stored in a separate computer system, with queries being transmitted by the network interface 406.

If the template matcher 412 finds a match, template updater 414 determines whether the template can be generalized. If so, template updater 414 generates a new template, for example with one or more additional wildcards as compared to a previous version of the template, and stores the new template in the template database 410. If no match is found, then template creator 416 generates a new template that corresponds to the log message, and stores the new template in the template database 410.

A security console 418 monitors the aggregated messages. Certain patterns may represent anomalous behavior—for example, a spike in a number or frequency of messages matching a particular log message template may indicate a malicious intrusion or a failure of a network component, such as a webserver. The security console 418 provides information to a network administrator, for example identifying the log message template, and in some embodiments can perform a corrective action automatically. Examples of corrective actions include denying security accesses from to an anomalous system, rebooting or restarting a system that has failed, and changing an alert sensitivity for future anomalous behavior. The security console 418 can use the network interface 406 to trigger the corrective action in one or more other systems 104.

Figure 5:
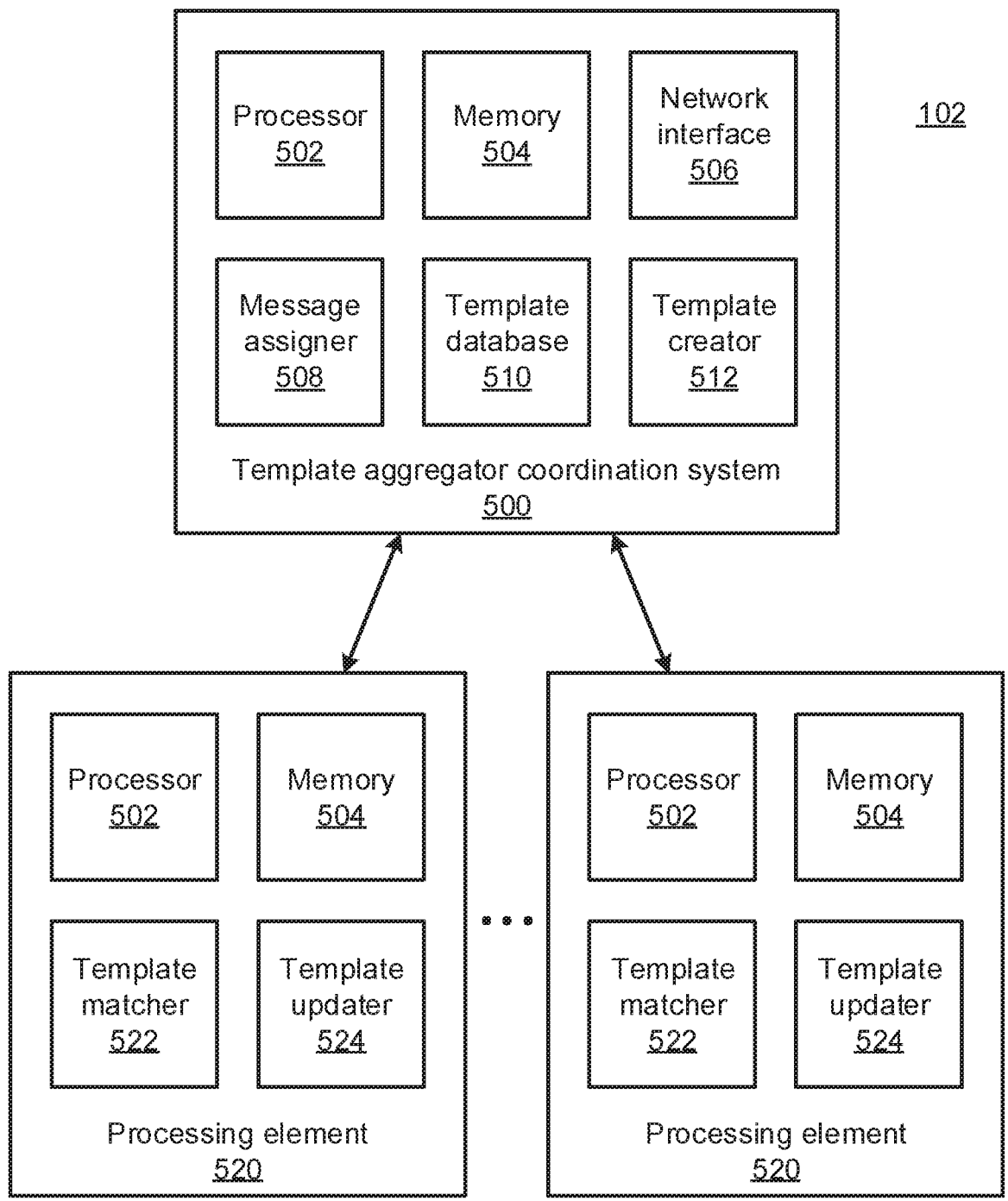
FIG. 5 is a block diagram of a log aggregation system that includes parallel processing elements for matching and updating templates, in accordance with an embodiment of the present invention.

Referring now to FIG. 5, an exemplary parallel processing embodiment of the log message aggregation system 102 is shown. A template aggregator coordination system 500 communicates with multiple processing elements 520 to coordinate the aggregation of log messages and the update of the template database 510. The template aggregator coordination system 500 and each processing element 520 includes a respective hardware processor 502 and a memory 504. In embodiments where the processing elements 520 are implemented as virtualized processing instances, the hardware processor 502 and the memory 504 refer to the hardware underlying the executed instances. The coordination system 500 and the processing elements 520 may furthermore include respective network interfaces 506 for inter-system communications.

In this parallelized embodiment, a message assigner at the coordination system 500 distributes the received log messages 106 to respective processing elements 520. Any appropriate selection mechanism can be used, for example assigning messages to respective processing elements 520 in a round-robin fashion. The messages are then processed by their assigned processing elements 520, with the template matcher 522 checking whether the message matches a message in the template database 510, and with a template updater 524 updating the template database as needed. The template database 510 can be stored at the coordination system 500, in some other centralized location, or can be replicated across the processing elements. In embodiments where the template database 510 is replicated across the processing elements, then updates are sent from the updating processing element 520 to all other processing elements. If no match is found, then a centralized template creator 512 maintains a shared queue of the unmatched messages in the memory 504, and generates new templates for the unmatched messages.

Figure 6:
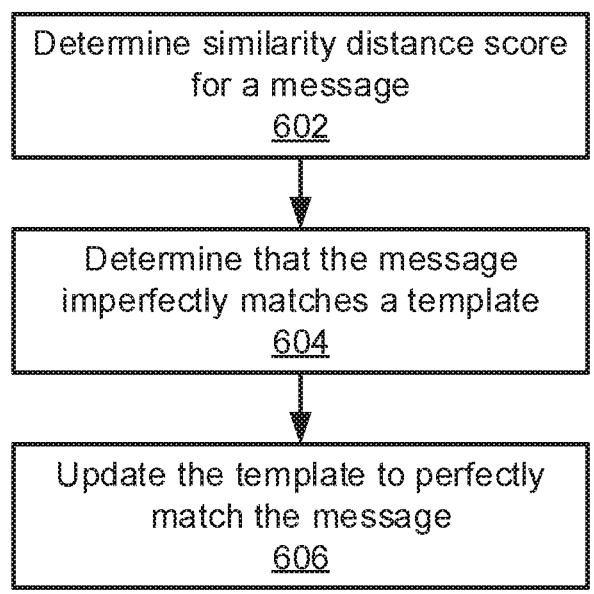
FIG. 6 is a block/flow diagram showing an embodiment of a method/system for updating a template after receipt of an imperfectly matching log message, in accordance with an embodiment of the present invention.

Referring now to FIG. 6, a method/system for updating templates is shown. In this embodiment, block 602 determines a similarity distance score for an incoming message. The incoming message is found to imperfectly match a template in block 604 (e.g., having a below-threshold, but non-zero similarity distance). The template is then updated to perfectly match the message, for example by replacing tokens in the template that differ from tokens in the message until the similarity distance score is zero.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
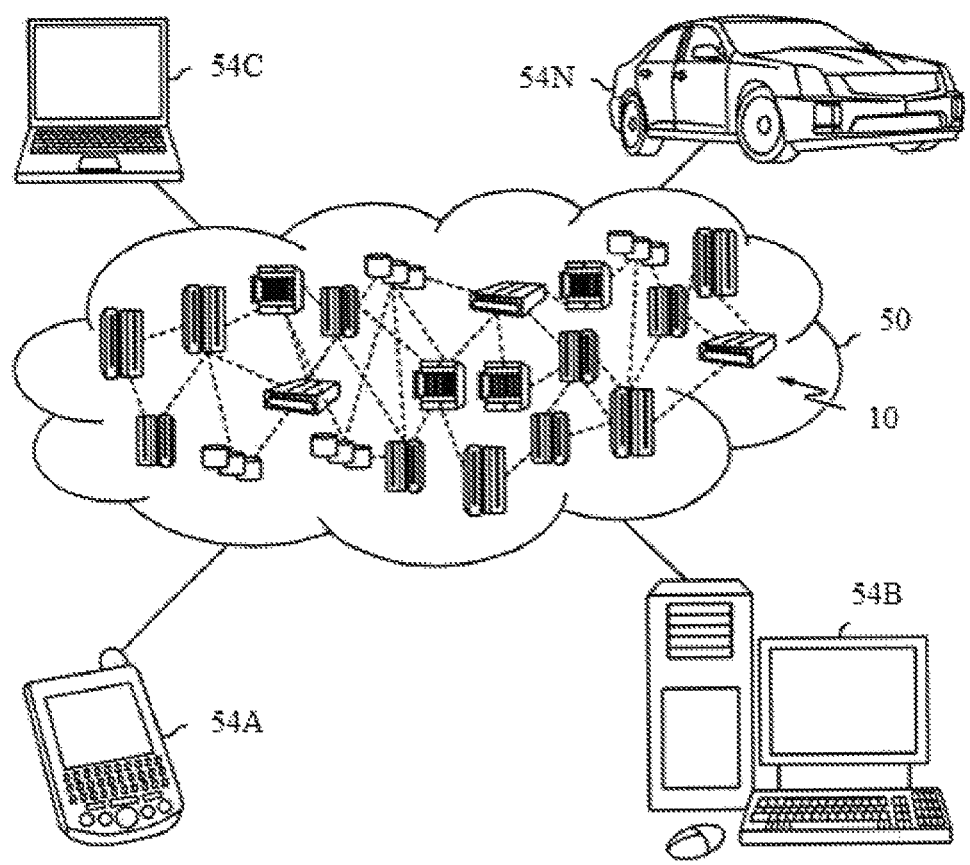
FIG. 7 is a block diagram showing an illustrative cloud computing environment having one or more cloud computing nodes with which local computing devices used by cloud consumers communicate in accordance with one embodiment.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. are intended to be illustrative only and that computing nodes 10 and cloud computing environment 50 can communicate with any type of computerized device over any type of network and/or network addressable connection (e.g., using a web browser).

Figure 8:
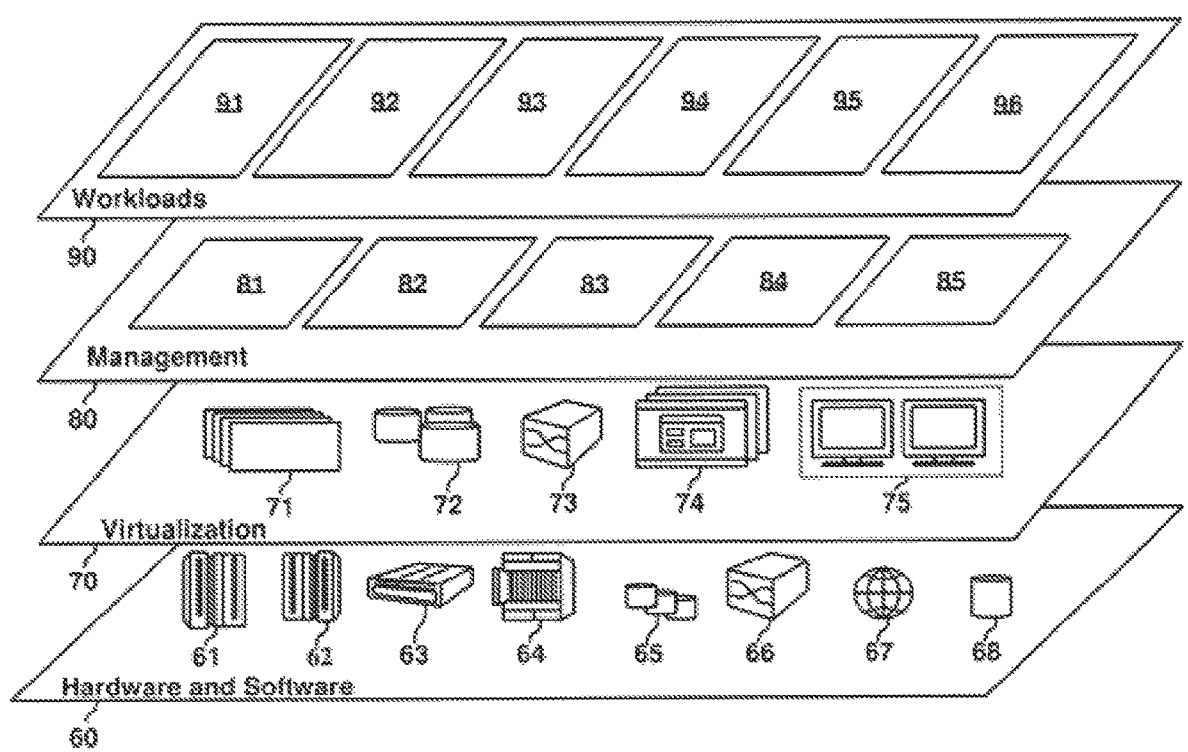
FIG. 8 is a block diagram showing a set of functional abstraction layers provided by a cloud computing environment in accordance with one embodiment.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and log message aggregation 96.

Having described preferred embodiments of automatic online log template mining (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer-implemented method for log message aggregation, comprising:
   tokenizing a first incoming message to generate tokens;
   comparing the tokens of the first incoming message to a plurality of stored templates using a token-based edit distance to generate a plurality of respective first similarity distance scores;
   normalizing the token-based edit distance by dividing by a number of tokens in a shorter of the first incoming message and the one or more stored templates;
   locating an imperfectly matched template of the plurality of stored templates, based on a corresponding one of the first similarity distance scores being non-zero and less than a threshold distance from the imperfectly matched template and further being less than any other of the plurality of first similarity distance scores;
   replacing a token in the imperfectly matched template with a wildcard, to reduce the corresponding first similarity distance score;
   determining anomalous activity according to a pattern of messages matching the imperfectly matched template; and
   automatically performing a corrective action responsive to the anomalous activity, selected from the group consisting of denying security accesses from an anomalous system, rebooting or restarting a system that has failed, and changing an alert sensitivity for future anomalous behavior.

2. The method of claim 1, wherein the wildcard matches any token in a same position of the first incoming message.

3. The method of claim 1, further comprising pre-processing the first incoming message to replace one or more tokens in the first incoming message with a pre-processing wildcard.

4. The method of claim 1, further comprising:
   determining a second similarity distance score for a second incoming message by comparing the second incoming message to the one or more stored templates;
   determining that the second similarity distance score does not match any of the one or more stored templates; and
   storing a new template that is based on the second incoming message.

5. The method of claim 4, wherein determining that the second incoming message does not match any of the one or more stored templates includes determining that the second incoming message has a second similarity distance score for each of the one or more stored templates that is greater than the threshold distance.

6. The method of claim 4, wherein determining the first similarity distance score and the second similarity distance score are processed in parallel.

7. The method of claim 6, further comprising adding the second message to a shared queue after determining that the second similarity distance score does not match any of the one or more stored templates and before storing the new template.

8. A non-transitory computer readable storage medium comprising a computer readable program for log message aggregation, wherein the computer readable program when executed on a computer causes the computer to perform the steps:
tokenizing a first incoming message to generate tokens;
comparing the tokens of the first incoming message to a plurality of stored templates using a token-based edit distance to generate a plurality of respective first similarity distance score;
normalizing the token-based edit distance by dividing by a number of tokens in a shorter of the first incoming message and the one or more stored templates;
locating an imperfectly matched template of the plurality of stored templates, based on a corresponding one of the first similarity distance score being non-zero and less than a threshold distance from the imperfectly matched template and further being less than any other of the plurality of first similarity distance scores;
replacing a token in the imperfectly matched template with a wildcard, to reduce the first corresponding similarity distance score;
determining anomalous activity according to a pattern of messages matching the imperfectly matched template; and
automatically performing a corrective action responsive to the anomalous activity, selected from the group consisting of denying security accesses from an anomalous system, rebooting or restarting a system that has failed, and changing an alert sensitivity for future anomalous behavior.

9. A log aggregation system, comprising:
a hardware processor;
a memory, configured to store a plurality of templates and program code that, when executed by the hardware processor, is configured to:
tokenize a first incoming message to generate tokens;
compare the tokens of the first incoming message to the plurality of stored templates using a token-based edit distance to generate a plurality of respective first similarity distance scores;
normalizing the token-based edit distance by dividing by a number of tokens in a shorter of the first incoming message and the one or more stored templates;
locate an imperfectly matched template of the plurality of stored templates, based on a corresponding one of the first similarity distance score being non-zero and less than a threshold distance from the imperfectly matched template and further being less than any other of the plurality of first similarity distance scores;
replace a token in the imperfectly matched template with a wildcard, to reduce the corresponding first similarity distance score
determine anomalous activity according to a pattern of messages matching the imperfectly matched template; and
automatically perform a corrective action responsive to the anomalous activity, selected from the group consisting of denying security accesses from an anomalous system, rebooting or restarting a system that has failed, and changing an alert sensitivity for future anomalous behavior.

10. The log aggregation system of claim 9, wherein the template updater is further configured to replace a token in the matched template with a new wildcard.

11. The log aggregation system of claim 9, further comprising a message pre-processor, configured to replace one or more tokens in the first incoming message with a pre-processing wildcard.

12. The log aggregation system of claim 9, wherein the template matcher is further configured to determine a second similarity distance score for a second incoming message by comparing the second incoming message to the one or more stored templates, and to determine that the second similarity distance score does not match any of the one or more stored templates, and further comprising a template creator, configured to store a new template that is based on the second incoming message.

13. The log aggregation system of claim 12, wherein the template matcher is further configured to determine that the second incoming message has a second similarity distance score for each of the one or more stored templates that is greater than the threshold distance.

14. The log aggregation system of claim 12, further comprising parallel instances, each having a separate template matcher configured to determine the first similarity distance score and the second similarity distance score in parallel.

15. The log aggregation system of claim 14, wherein the template matcher that determines the second similarity distance score is further configured to add the second message to a shared queue after determining that the second similarity distance score does not match any of the one or more stored templates.

16. The method of claim 1, wherein the token-based edit distance is a Levenshtein metric.

* * * * *